US008537395B2

(12) United States Patent  (10) Patent No.: US 8,537,395 B2
Shozaki  (45) Date of Patent: Sep. 17, 2013

(54) IMAGE PROCESSING SYSTEM, IMAGE PROCESSING APPARATUS, RECORDING MEDIUM AND DATA COMMUNICATION ESTABLISHING METHOD

(75) Inventor: Toshiya Shozaki, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 276 days.

(21) Appl. No.: 12/974,066

(22) Filed: Dec. 21, 2010

(65) Prior Publication Data

US 2011/0157643 A1    Jun. 30, 2011

(30) Foreign Application Priority Data

Dec. 25, 2009   (JP) ................................ 2009-293632

(51) Int. Cl.
*G06F 3/12*    (2006.01)
(52) U.S. Cl.
USPC ......... 358/1.15; 358/1.14; 709/227; 709/228; 709/229; 726/2; 726/27; 726/28; 726/29
(58) Field of Classification Search
USPC ............... 358/1.14, 1.15; 709/227, 228, 229; 726/2, 27, 28, 29
See application file for complete search history.

(56) References Cited

U.S. PATENT DOCUMENTS

| 2002/0169961 | A1* | 11/2002 | Giles et al. ..................... 713/175 |
| 2005/0033957 | A1* | 2/2005 | Enokida ........................ 713/156 |
| 2006/0099947 | A1 | 5/2006 | Shozaki et al. |
| 2007/0234044 | A1 | 10/2007 | Kudo et al. |
| 2008/0060055 | A1* | 3/2008 | Lau ................................... 726/3 |

FOREIGN PATENT DOCUMENTS

| JP | 2004-537101 A | 12/2004 |
| JP | 2005-039790 A | 2/2005 |
| JP | 2006-139347 A | 6/2006 |
| JP | 2007-174314 A | 7/2007 |
| JP | 2007174314 A * | 7/2007 |
| JP | 2007-272610 A | 10/2007 |
| JP | 2007-274403 A | 10/2007 |
| JP | 2008-226046 A | 9/2008 |
| JP | 2009-159053 A | 7/2009 |
| JP | 2009-290508 A | 12/2009 |
| WO | WO 02/093377 A1 | 11/2002 |

OTHER PUBLICATIONS

Office Action dated Nov. 1, 2011, issued in the corresponding Japanese Patent Application No. 2009-293632, and an English Translation thereof.

* cited by examiner

*Primary Examiner* — Jacky X Zheng
(74) *Attorney, Agent, or Firm* — Buchanan Ingersoll & Rooney PC

(57) ABSTRACT

An image processing apparatus associates application information to connect to a server device and a client certificate to transmit to the server device with each other and stores therein the associated application information and client certificate. An application managing part activates a browser with designating transmission of the client certificate which is associated with the application information. The browser transmits the client certificate identified by the application managing part to the server device when a request for transmission of the client certificate is received from the server device. As the result, the image processing apparatus reduces operation load placed on a user to transmit the client certificate to the server device. Moreover, the appropriate client certificate may be transmitted to the server device without lowering efficiency in processing. So, data communication between the image processing apparatus and the server device may be established rapidly.

11 Claims, 14 Drawing Sheets

IMAGE PROCESSING SYSTEM 1

FIG. 6

APPLICATION MANAGEMENT DATA 23

| No. | APPLICATION INFORMATION 43 | | CLIENT CERTIFICATE 45 |
|---|---|---|---|
| | NAME | DESTINATION INFORMATION | |
| APP. 1 | SERVER A | ###.###.###. | 12345······ |
| APP. 2 | SERVER B | ###.###.###. | |
| APP. 3 | SERVER C | ###.###.###. | 34567······ |
| APP. 4 | SERVER D | ###.###.###. | 45678······ |

FIG. 14

| NAME | ISSUER |
|---|---|
| NAME1 | SEVER_A |
| NAME2 | SEVER_B |
| NAME3 | SEVER_C |
| NAME4 | SEVER_D |
| NAME5 | SEVER_E |

THE SERVER DEVICE TO BE CONNECTED REQUIRES A CLIENT CERTIFICATE. PLEASE SELECT A CLIENT CERTIFICATE TO BE TRANSMITTED TO THE SERVER DEVICE.

OK    CANCEL

IMAGE PROCESSING SYSTEM, IMAGE PROCESSING APPARATUS, RECORDING MEDIUM AND DATA COMMUNICATION ESTABLISHING METHOD

This application is based on the application No. 2009-293632 filed in Japan, the contents of which are hereby incorporated by reference.

BACKGROUND OF THE INVENTION

1. Field of the Invention

The present invention relates to an image processing system, an image processing apparatus, a recording medium and a data communication establishing method. The present invention more specifically relates to a technique of establishing data communication between an image processing apparatus and a server device in an image processing system in which the image processing apparatus is allowed to use an application service provided by the server device with performing data communication between the image processing apparatus and the server device.

2. Description of the Background Art

A widely known conventional image processing apparatus identified by a name such as a digital complex device or a MFP (multifunction peripheral) is connected to a network, and is capable of performing data communication with a variety of devices connected to the network. Especially in these days, data communication between the image processing apparatus and a server device through the network allows the image processing apparatus to use an application service provided by the server device as a client.

In this case, each server device provides different application service to the image processing apparatus. By way of example, the server device receives image data from the image processing apparatus, and processes the received image data or forwards the image data to another device. So, the server device is able to provide a service which allows sharing with the server device a part or a whole part of a job which used to be executed in a body of the image processing apparatus. Another, the server device executes a processing such as image processing which is not implemented in the image processing apparatus, thereby providing a particular function to the image processing apparatus.

When performing data communication with a device such as the server device through the network, the image processing apparatus needs to prevent wiretapping and others of information released over the network. Therefore, a method such as SSL (Secure Socket Layer) session which provides high security is recently employed as a method of data communication. The SSL session establishes data communication between the image processing apparatus and the server device with exchange of certificate data hold by each device. Once data communication is established, communication is performed between the image processing apparatus and the server device with data being encrypted. Therefore, wiretapping and others may be prevented.

FIG. 13 shows the sequence of operations of the image processing apparatus and the server device for SSL session. A client certificate is registered in advance with an image processing apparatus 102, and a server certificate is registered in advance with a server device 103. When starting data communication with the server device 103, the image processing apparatus 102 sends a request for connection to the server device 103. As receiving the request for connection, the server device 103 transmits the server certificate to the image processing apparatus 102. At the same time, the server device 103 sends a request for transmission of the client certificate (hereafter, request for client certificate) to the image processing apparatus 102 if necessary. In response to the receipt of the request for client certificate, the image processing apparatus 102 transmits the client certificate that is registered in advance to the server device 103. The image processing apparatus 102 and the server device 103 each then acquires the certificate of the other side of communication. The image processing apparatus 102 and the server device 103 each executes authentication processing of the other side of communication. When authentication results in success, a key for encryption and decryption for data communication becomes identifiable. So, after the key becomes identifiable, data communication thereafter may be performed with encrypted data between the image processing apparatus 102 and the server device 103.

As described above, in order to establish data communication between the image processing apparatus and the server device, a client certificate is required to be registered in advance with the image processing apparatus. A following way of registration of the client certificate is conventionally used such as that disclosed for example in Japanese Patent Application Laid-Open No. JP2007-274403 A (called patent document 1). According to the way, for example, a user makes operation of his or her computer, thereby giving instructions to install the client certificate. Then, user-specific user information and the client certificate are transmitted from the computer to the image processing apparatus. When receiving the information and storing the received information in a hard disk drive, the image processing apparatus associates the user-specific user information and the client certificate with each other, and registers therein.

Moreover, widely known conventional technique to select one client certificate from multiple client certificates when the multiple client certificates are registered with the image processing apparatus is disclosed for example in Japanese Patent Application Laid-Open No. JP2008-226046 A (called patent document 2). The technique disclosed therein stores profile information in which information related to each client certificate is defined. According to the technique disclosed for example in the patent document 2, for selection of the client certificate, whether or not respective information defined in the profile information matches the client certificate to be used is searched. If the profile information matches, one client certificate to be used may be selected.

According to the above-described patent document 1, however, the client certificate is associated with the user-specific user information. So, it is possible to have the multiple client certificates to be associated with the user information of one user. It is assumed that the multiple client certificates are associated with the user information, and registered with the image processing apparatus. The image processing apparatus is then made incapable of determining that the image processing apparatus should send which client certificate of the multiple client certificates when receiving the request for client certificate from the server device. In such case, the conventional technique displays the multiple client certificates in a list form, and makes the user to select one client certificate from the list.

FIG. 14 is an example of a conventional screen for selection of the client certificate. In the example, five client certificates are associated with the user information. When such screen for selection of the client certificate is displayed, the user makes operation to select a client certificate to be used from the displayed list. One client certificate to be used for the image processing apparatus is then designated.

The technique brings a problem that the operation as introduced above to select the client certificate is troublesome for the user. Especially, the list of the multiple client certificates only shows information related to each certificate. So, it is difficult for the user to identify which client certificate of the list is the appropriate client certificate which corresponds to the server device the user would like to connect. Therefore, sometimes, the user selects the wrong client certificate and the authentication in the server device results in failure.

On the other hand, the technique disclosed in the patent document 2 allows one client certificate to be selected from the multiple client certificates by searching profile information. However, in this case, the problem is that the search processing takes long time. Also, when the multiple client certificates are extracted as the result of search processing, the technique of the patent document 2 makes the user to select one client certificate from the extracted multiple client certificates. In this case, despite the search processing takes long execution time, the user further needs to make operation to select. So, efficiency and operability of processing are significantly reduced.

SUMMARY OF THE INVENTION

The present invention has been made to solve the above-described problems. It is an object of the present invention to provide an image processing system, an image processing apparatus, a recording medium and a data communication establishing method that realize the followings when the image processing apparatus transmits a client certificate to a server device. First, a burden to be placed on a user for making operation is reduced. Second, appropriate client certificate is transmitted to the server device without reducing the efficiency of processing. As a result, data communication between the image processing apparatus and the server device is allowed to be established quickly.

First, the present invention is directed to an image processing system in which data communication is performed between an image processing apparatus and a server device, and the image processing apparatus is made capable of using an application service provided by the server device.

According to one aspect of the image processing system, the server device includes: a transmission part for transmitting in advance application information to use the application service and a client certificate to authenticate the image processing apparatus to the image processing apparatus; and a communication controlling part for sending a request for transmission of the client certificate to the image processing apparatus when a request for connection is received from the image processing apparatus, and for establishing data communication with the image processing apparatus subject to acquisition of a certificate which matches the client certificate transmitted in advance to the image processing apparatus, thereby causing the image processing apparatus to be capable of using the application service. The image processing apparatus includes: a storage part for associating said application information and the client certificate received in advance from said server device with each other and for storing therein said associated application information and client certificate; an operation part which includes a display part on which various types of information is displayed; a browser for acquiring information of a screen to use the application service from the server device by performing data communication with the server device and for making the screen displayed on the display part; and an application managing part for managing the application information and the client certificate stored in the storage part and for controlling the browser. When use of the application service is specified via the operation part, the application managing part sets information to connect to the server device based on the application information and activates the browser with designating transmission of the client certificate which is associated with the application information if the request for transmission of the client certificate is received from the server device. The browser sends the request for connection to the server device based on the information set by the application managing part, and transmits the client certificate identified by the application managing part to the server device when the request for transmission of the client certificate is received from the server device, thereby establishing data communication with the server device.

Second, the present invention is directed to an image processing apparatus performs data communication with a server device, thereby using an application service provided by the server device.

According to one aspect of the image processing apparatus, the image processing apparatus comprises: a storage part for associating application information and a client certificate received in advance from the server device with each other, and for storing therein the associated application information and client certificate; an operation part which includes a display part on which various types of information is displayed; a browser for acquiring information of a screen to use the application service from the server device by performing data communication with the server device and for making the screen displayed on the display part; and an application managing part for managing the application information and the client certificate stored in the storage part and for controlling the browser. When use of the application service is specified via the operation part, the application managing part sets information to connect to the server device based on the application information and activates the browser with designating transmission of the client certificate which is associated with the application information if a request for transmission of the client certificate is received from the server device. The browser sends a request for connection to the server device based on the information set by the application managing part, and transmits the client certificate identified by the application managing part to the server device when the request for transmission of the client certificate is received from the server device, thereby establishing data communication with the server device.

Third, the present invention is directed to a computer readable medium on which a program is stored. The program is to be executed by an image processing apparatus in which an application service provided by a server device is used by performing data communication with said server device.

According to one aspect of the image processing apparatus, the image processing apparatus includes: a storage part for storing various types of information; an operation part which includes a display part on which various types of information is displayed; a browser for acquiring information of a screen to use the application service from the server device by performing data communication with the server device and for displaying the acquired information of the screen on the display part; and a computer for executing the program. The program causes the computer to execute processing comprising the steps of: (a) associating application information and a client certificate received from the server device with each other and storing the associated application information and client certificate in the storage part; and (b) setting information to connect to the server device based on the application information when use of the application service is specified via the operation part and activating the browser with designating transmission of the client certificate associated with the application information if a request for transmission of the client certificate is received from said server device.

Forth, the present invention is directed to a data communication establishing method for establishing data communication with a server device employed in an image processing apparatus which uses an application service provided by the server device with performing data communication with the server device.

According to one aspect of the method, the method comprises the steps of: (a) associating application information and a client certificate received in advance from the server device with each other and storing the associated application information and client certificate in a predetermined storage part; (b) transmitting a request for connection to the server device based on the application information when use of the application service is specified via a predetermined operation part; and (c) transmitting the client certificate which is associated with the application information in the storage part when a request for transmission of the client certificate is received from the server device after transmission of the request for connection, thereby establishing data communication with the server device.

BRIEF DESCRIPTION OF THE DRAWINGS

FIG. 6 shows an example of the application management data;

FIG. 14 is an example of a conventional screen for selection of a client certificate.

DESCRIPTION OF THE PREFERRED EMBODIMENTS

Figure 1:
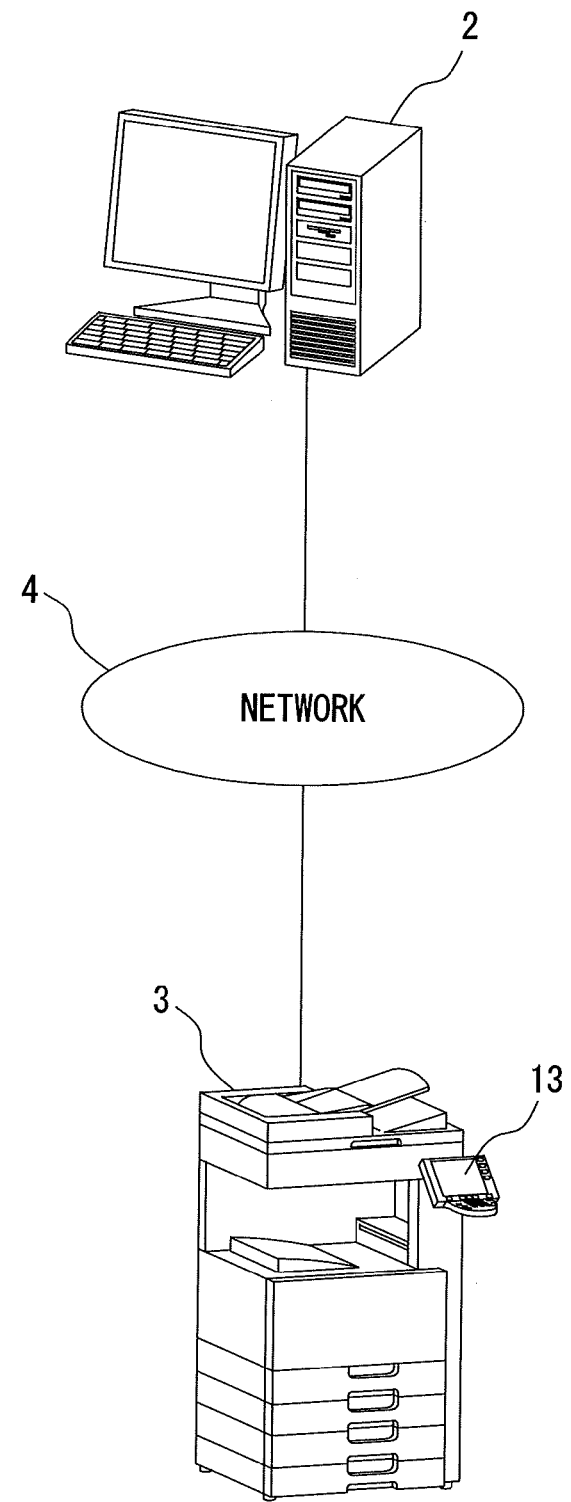
FIG. 1 shows an exemplary configuration of an image processing system of the present invention.

Preferred embodiments of the present invention are described in detail below with reference to figures. In the description given below, those elements which are shared in common among the preferred embodiments are represented by the same reference numerals, and these elements are not discussed repeatedly for the same description.

FIG. 1 shows an exemplary configuration of an image processing system 1 of the present invention. The image processing system 1 includes: a server device 2, an image processing apparatus 3 and a network 4. The server device 2 and the image processing apparatus 3 is each connected to the network 4, and is allowed to make data communication with each other through the network 4. The network 4 is a network which includes, for example, a LAN (Local Area Network), a WAN (Wide Area Network), an internet or the like. While one server device 2 and one image processing apparatus 3 are shown to be connected to the network 4 in FIG. 1, the number of each device is not limited to one. The number may be more than one.

The image processing apparatus 3 is identified by a name such as a complex device or an MFP, and has several functions including, for example, a copy function, a scanner function, a FAX function, a print function, and a storage function. The image processing apparatus 3 is provided with an operational panel 13 operable by a user to make entry. In response to an operation for instructions made by the user on the operational panel 13, the image processing apparatus 3 executes processing in accordance with the operation. When receiving a command, a request an others through the network 4, the image processing apparatus 3 is also capable of executing processing corresponding to those command and others.

The server device 2 is a server which performs data communication with the image processing apparatus 3 through the network 4, thereby providing an application service to the image processing apparatus 3. The application service provided by the server device 2 to the image processing apparatus 3 may be a service to share and processing a part or a whole of a job executed in the image processing apparatus 3. The application service may also be a service that provides execution of a function (such as image processing) which is not included in the image processing apparatus 3. Moreover, it may be a following service. A customized display screen is stored in advance to be displayed on the operational panel 13 of the image processing apparatus 3, and the stored display screen is transmitted to the image processing apparatus 3. Therefore, the customized display screen is displayed on the operational panel 13.

The server device 2 functions as a web server, thereby providing such application service. In contrast, a browser program which functions as a web browser (hereafter, "browser") is installed in advance in the image processing apparatus 3. The user makes an operation of the operational panel 13 to give instructions for using the application service provided by the server device 2. In response to the instructions, the image processing apparatus 3 executes the browser program, and starts establishing data communication with the server device 2.

Figure 13:
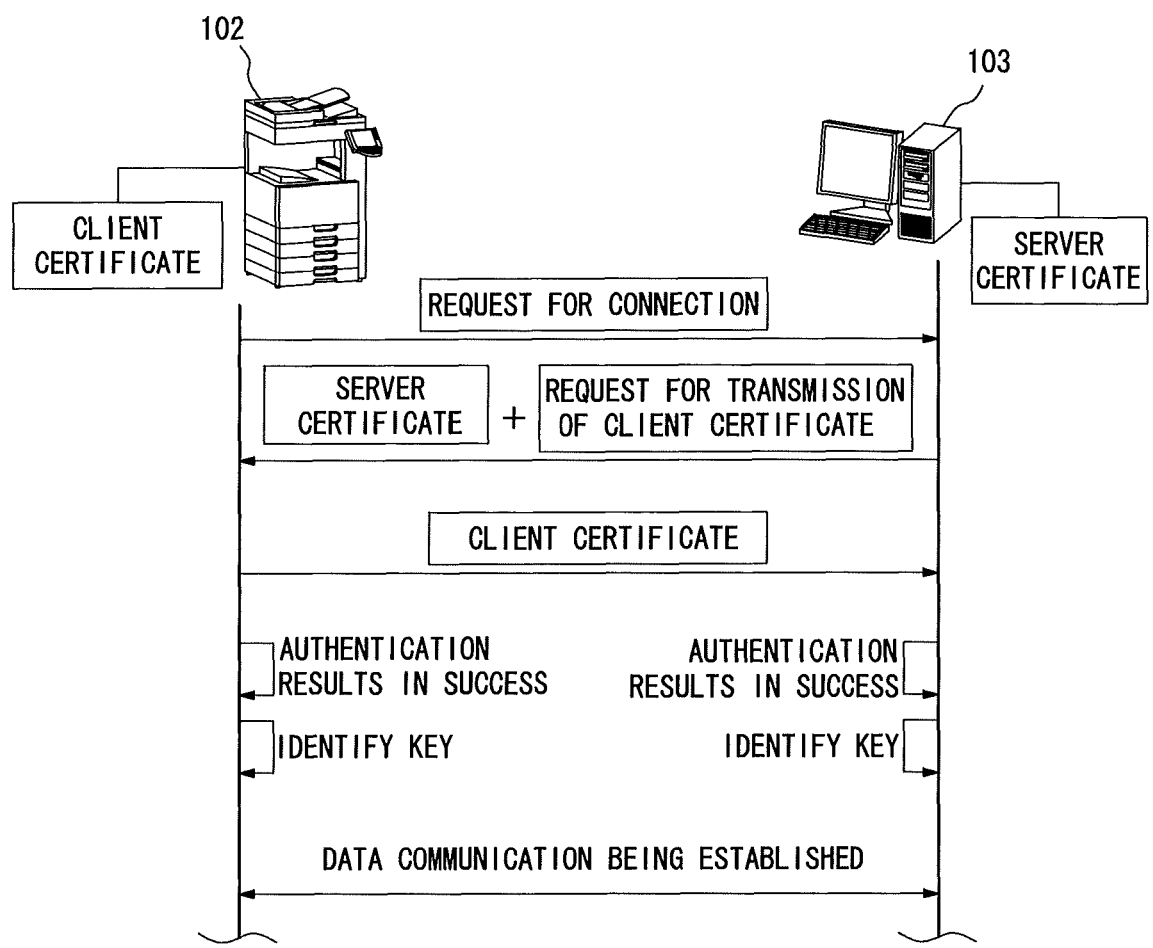
FIG. 13 shows the sequence of operations of the image processing apparatus and the server device for SSL session.

In this preferred embodiment, SSL session with high security, for example, is employed as for data communication system between the image processing apparatus 3 and the server device 2. As being activated in the image processing apparatus 3, the browser sends the request for connection to the server device 2 as illustrated in FIG. 13. In response to the receipt of the request for connection, the server device 2 transmits a server certificate to the browser of the image processing apparatus 3, and sends the request for client certificate as required. As receiving the request for client certificate from the server device 2, the browser of the image processing apparatus 3 transmits a client certificate registered in advance. The image processing device 3 and the server device 2 each executes authentication processing of the other side of communication therein. When the authentication results in success, a key for encryption and decryption used for data communication may be identified. Therefore, after the key is identified, data communication state in which the image processing apparatus 3 and the server device 2 make data communication with each other with encrypted data is established.

After establishing data communication in which communication with encrypted data is performed with the server device 2, the browser activated in the image processing apparatus 3 acquires a display screen to be displayed on the operational panel 13 from the server device 2, and displays the acquired display screen on the operational panel 13. As a result, the user is allowed to make operation to set various types of settings for using the application service provided by the server device 2, or to give instructions such as that for execution to the server device 2. In response to such operation made by the user, the browser transmits information of the operation to the server device 2. After receiving the information of the operation from the browser, the server device 2 executes processing corresponding to the received information of the operation, thereby providing the application service. To be more specific, the server device 2 performs data communication with the image processing apparatus 3, thereby working together with the image processing apparatus 3 to execute a processing as to a job.

In this type of image processing system 1, in order for the image processing apparatus 3 and the server device 2 to establish data communication with SSL session, application information and a client certificate required for connection with the server device 2 need to be registered in advance with the image processing apparatus 3. In the preferred embodiment, when the application information and the client certificate to be registered with the image processing apparatus 3, the application information and the client certificate are associated with each other one-to-one and registered. So, when instructions to use the application service are given by the user, the application information is designated based on the instructions. The client certificate to be transmitted to the server device 2 is also designated based on the application information. The detail is stated below.

Figure 2:
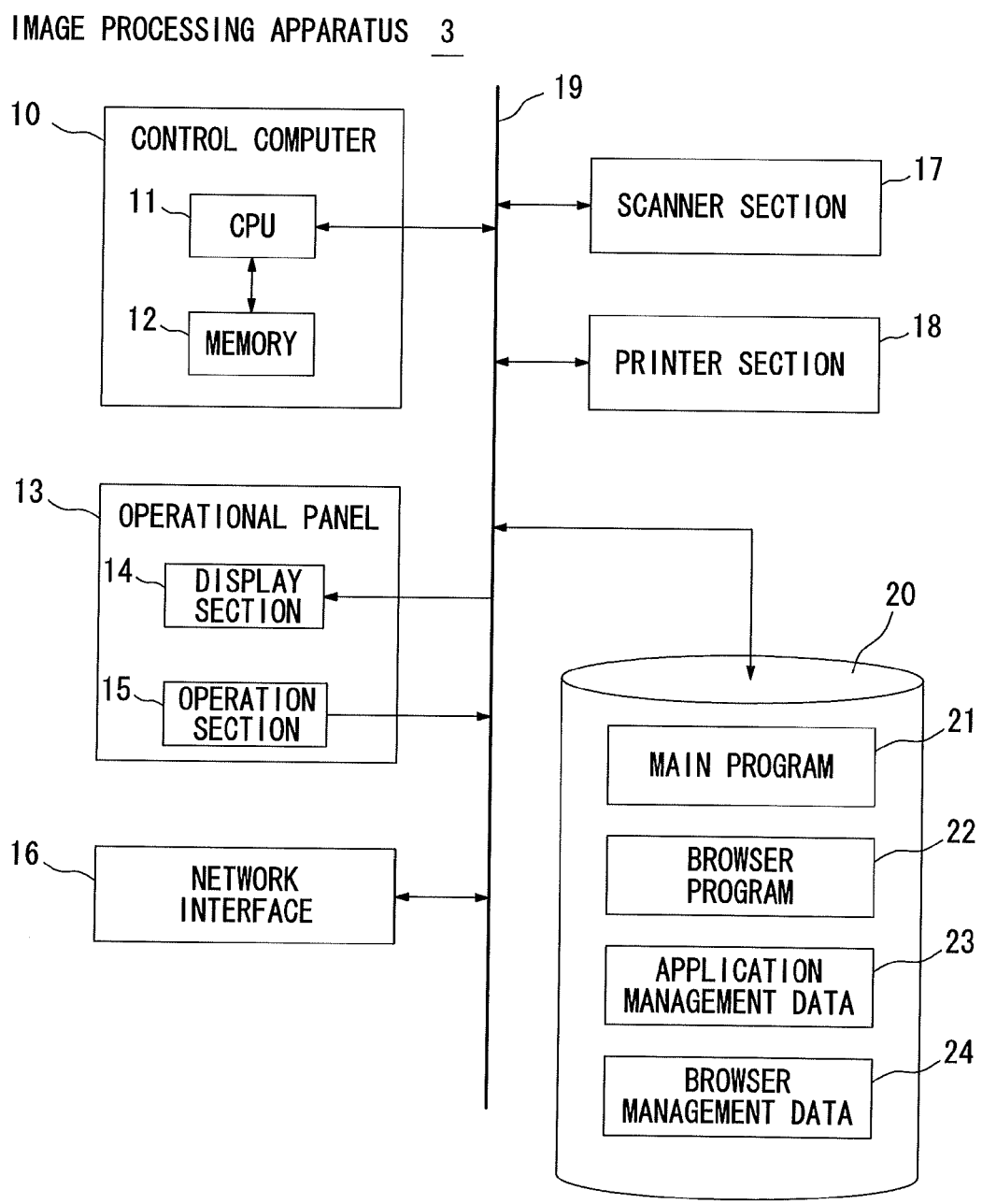
FIG. 2 is a block diagram showing an exemplary hardware configuration of an image processing apparatus.

FIG. 2 is a block diagram showing an exemplary hardware configuration of the image processing apparatus 3. As shown in FIG. 2, the image processing apparatus 3 includes a control computer 10, the operational panel 13, a network interface 16, a scanner section 17, a printer section 18, and a storage device 20 that are connected to each other through a data bus 19 in a manner that allows data input and output.

The control computer 10 includes a CPU 11 and a memory 12. As the image processing apparatus 3 to be turned on, the CPU 11 reads and executes a main program 21 stored in the storage device 20. The CPU 11 then becomes operative to control each part. When the application service provided by the server device 2 is not used in the image processing apparatus 3, the CPU 11 executes various types of processing with activating only the main program 21. When the application service provided by the server device 2 is used in the image processing apparatus 3, the CPU 11 additionally reads and activates a browser program 22 with the main program 21 being activated. In this case, the control computer 10 is put into operation to enable a function as a browser in addition to enabling functions realized by the main program 21. The memory 12 stores data therein such as temporary data required when the CPU 11 executes various types of processing.

The operational panel 13 includes a display section 14 on which various types of information are displayed, and an operation section 15 with which the user makes variety of operations. The display section 14 is formed from a device such as a liquid crystal color display. The display screen of the display section 14 is controlled by the control computer 10. The operation section 15 is constituted by touch panel keys arranged on the screen of the display section 14, and push-button keys arranged around the display section 14. After detecting an operation made by the user, the operation section 15 outputs information of detected operation to the control computer 10.

The network interface 16 is responsible for connecting the image processing apparatus 3 to the network 4. As receiving data through the network 4, the network interface 16 outputs the received data to the control computer 10. As receiving data to transmit to the network 4 from the control computer 10, the network interface 16 transmits the received data to the network 4.

The scanner section 17 reads a document and generates image data. When, for example, instructions for execution of a job of a function such as a copy function, a scanner function and a fax transmission function are given, the scanner section 17 is put into operation to read a document based on the instructions given from the control computer 10.

The printer section 18 forms an image on a printing medium such as a printing sheet, thereby outputting a printing. When, for example, execution of a job of a function such as the copy function, the print function and a FAX receiving function is specified, the printer section 18 executes print output based on the instructions from the control computer 10.

The storage device 20 is formed from a nonvolatile storage device such as a hard disk drive. The storage device 20 stores therein the main program 21 and the browser program 22 installed in advance as described above. The storage device 20 stores therein application management data 23 and browser management data 24.

The application management data 23 is a data table in which the application information and the client certificate registered in advance to use the application service provided by the server device 2 is stored.

The browser management data 24 is data managed by the browser which is put into operation with the browser program 22 to be executed. The browser management data 24 stores therein, for example, a server certificate and a client certificate acquired by the browser in the past through the network 4. The browser management data 24 is data the same as the one managed by a conventionally used web browser. So, in the browser management data 24, the server certificate and the client certificate are each stored in the distinguished storage region, and has no correspondence relation with each other. The client certificate stored in the browser management data 24 is different from the client certificate stored in the application management data 23.

Figure 3:
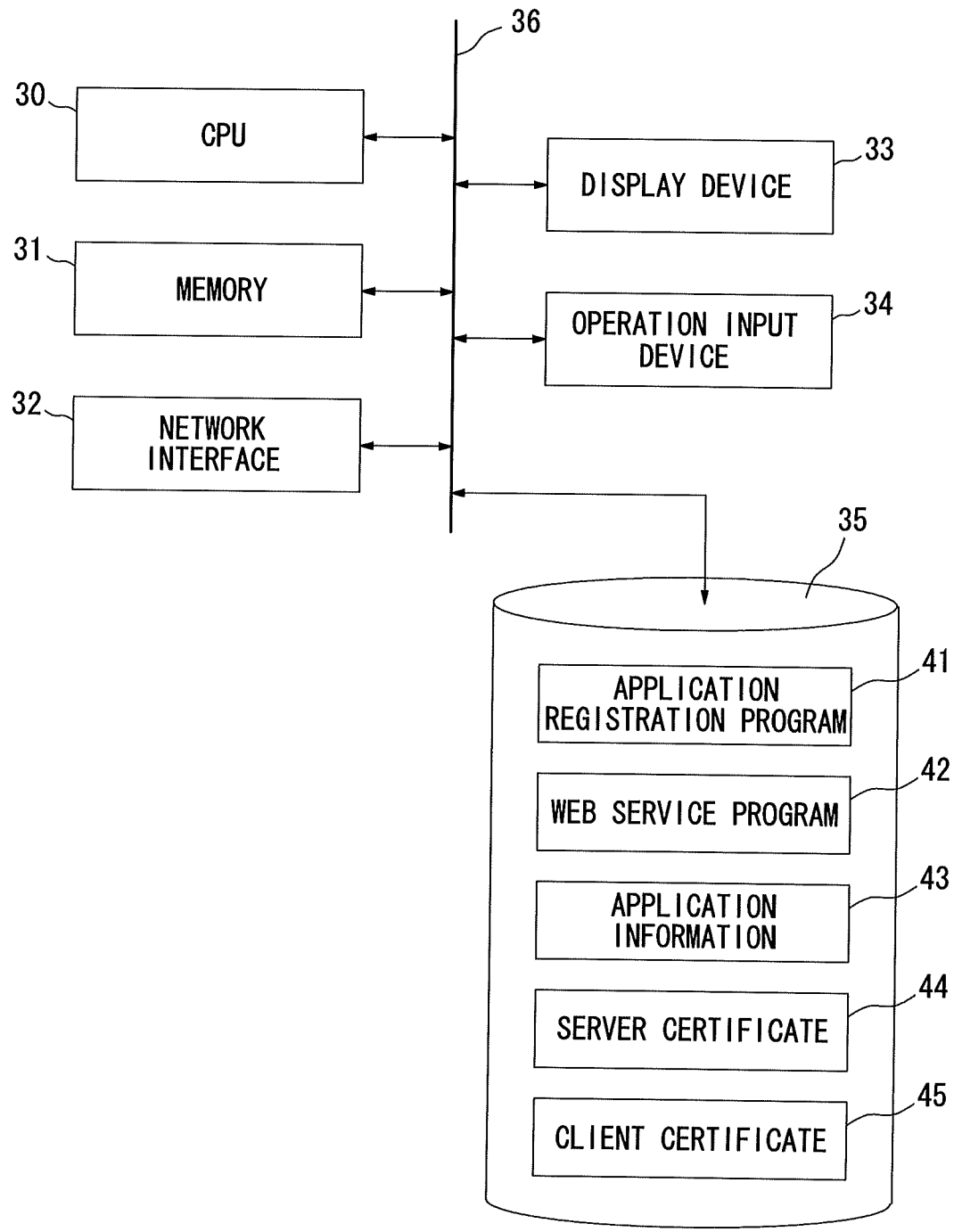
FIG. 3 is a block diagram showing an exemplary hardware configuration of a server device.

FIG. 3 is a block diagram showing an exemplary hardware configuration of the server device 2. As shown in FIG. 3, the server device 2 includes a CPU 30, a memory 31, a network interface 32, a display device 33, an operation input device 34 and a storage device 35 that are connected to each other through a data bus 36 in a manner that allows data input and output.

The CPU 30 reads and executes variety of programs stored in the storage device 35. The storage device 35 stores therein an application registration program 41 and a web service program 42 installed in advance as programs executed by the CPU 30. The application registration program 41 is executed by the CPU 30 when the application service provided by the server device 2 is registered with the image processing apparatus 3. The web service program 42 is executed by the CPU 30 when the application service provided by the server device 2 is actually provided to the image processing apparatus 3.

The memory 31 stores data therein such as temporary data when the CPU 30 executes the above-described variety of programs.

The network interface 32 is to connect the server device 2 to the network 4. In response to receipt of data through the network 4, the network interface 32 outputs the received data to the CPU 30. As receiving data to transmit to the network 4 from the CPU 30, the network interface 32 transmits the data to the network 4.

The display device 33 is formed from a device such as a liquid crystal display for displaying various types of information to a user such as an administrator of the server device 2. The operation input device 34 is formed, for example, from a keyboard and a mouse, and through which the user such as the administrator of the server device 2 makes operation to entry.

The storage device 35 is formed from a nonvolatile storage device such as a hard disk drive. The storage device 35 stores therein the application registration program 41 and the web service program 42 installed in advance as described above. In addition, the storage device 35 stores therein application information 43, a server certificate 44 and a client certificate 45.

The application information 43 is information registered with the image processing apparatus 3, and includes a name of the application service (or a name of the server device 2) provided by the server device 2, information of destination (for example, information such as IP address, port number and URL) used when the image processing apparatus 3 connects to the server device 2, or the like.

When the request for connection to use the application service is sent from the image processing apparatus 3, the server certificate 44 is transmitted to the image processing apparatus 3. The server certificate 44 is data for the browser activated in the image processing apparatus 3 to authenticate the server device 2. This server certificate 44 includes key information used for encryption and decryption when performing data communication with each other after data communication between the image processing apparatus 3 and the server device 2 is established.

The client certificate 45 is information registered with the image processing apparatus 3, and is certificate data transmitted in advance to the image processing apparatus 3 with the application information 43. The client certificate 45 is for the server device 2 to authenticate the image processing apparatus 3. As well as the server certificate 44, the client certificate 45 includes key information used for encryption and decryption when performing data communication with each other after data communication between the image processing apparatus 3 and the server device 2 is established.

Figure 4:
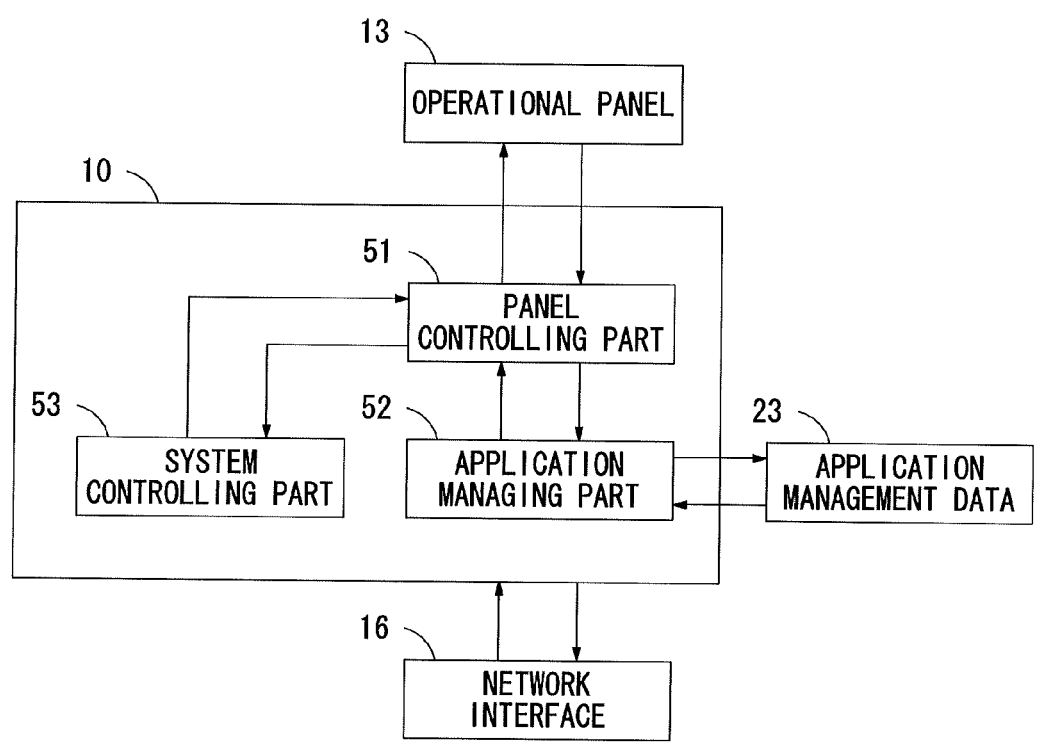
FIG. 4 is a block diagram showing the functional configuration realized by execution of a main program in the image processing apparatus.

Next, processing to register the application management data 23 with the image processing apparatus 3 is explained. FIG. 4 is a block diagram showing the functional configuration realized by execution of the main program 21 by the CPU 11 of the image processing apparatus 3. As illustrated in FIG. 4, in response to the execution of the main program 21 by the CPU 11, the control computer 10 is put into operation to function as a panel controlling part 51, an application managing part 52 and a system controlling part 53.

The panel controlling part 51 is responsible for controlling the operational panel 13. The panel controlling part 51 functions to change the display screen displayed on the display section 14, and to detect user's operation made to the operation section 15.

The application managing part 52 is responsible for managing the application management data 23 stored in the storage device 20. The application managing part 52 monitors data received by the network interface 16. As receiving a registration command from the server device 2, the application managing part 52 registers the application information 43 and the client certificate 45 received with the registration command in the application management data 23.

The system controlling part 53 is responsible for controlling each of the scanner section 17 and the printer section 18. When a job is executed in the image processing apparatus 3, the system controlling part 53 controls operation of each part based on a procedure of the job execution.

Figure 5:
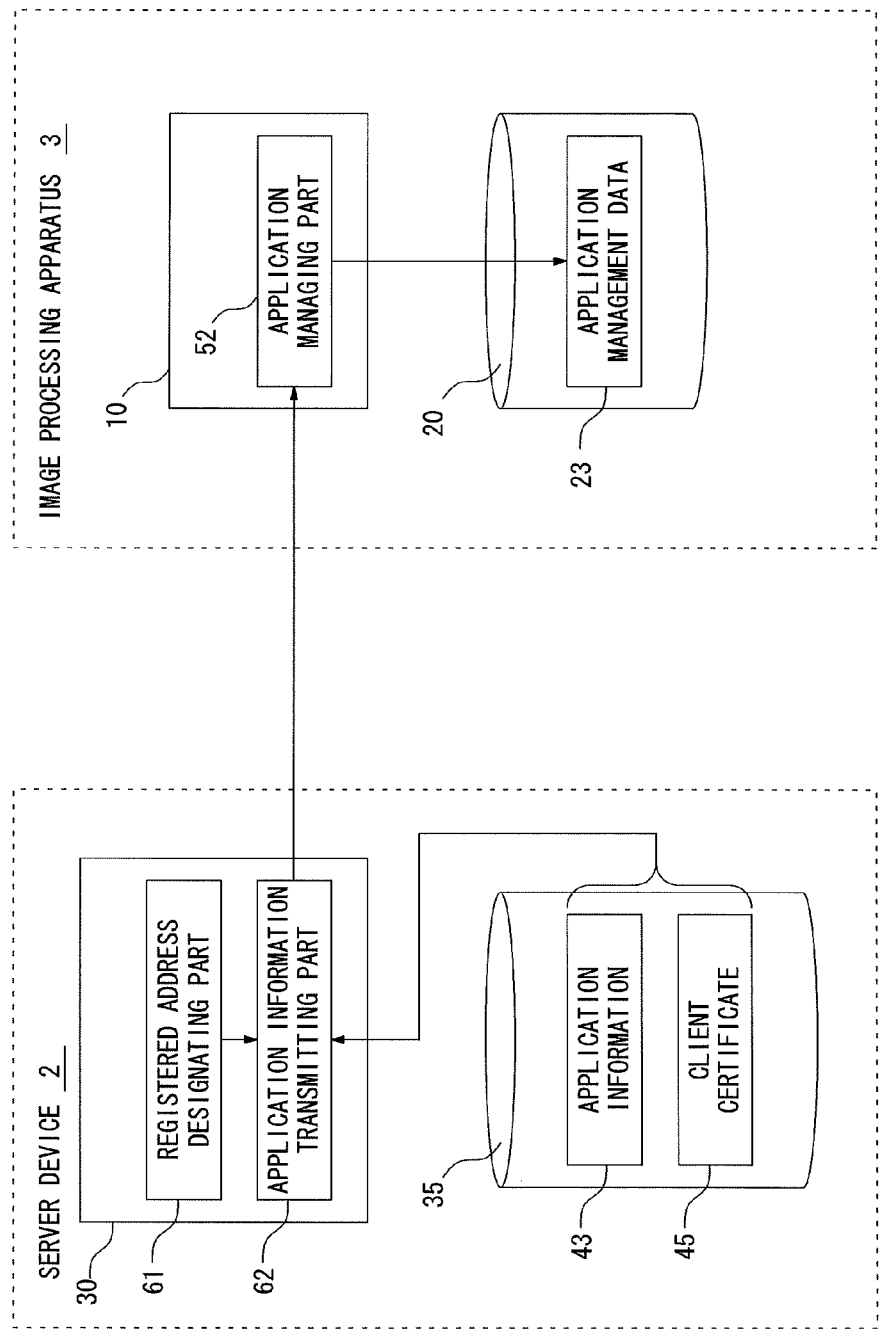
FIG. 5 conceptually shows a processing executed by the server device and the image processing apparatus when application management data is registered.

FIG. 5 conceptually shows the processing executed by the server device 2 and the image processing apparatus 3 when the application management data 23 is registered. By way of example, when an operation to register the application information 43 with the image processing apparatus 3 is made by the administrator of the server device 2, the CPU 30 of the server device 2 is put into operation to execute the application registration program 41. As the result, the CPU 30 of the server device 2 functions as a registered address designating part 61 and an application information transmitting part 62 as shown in FIG. 5.

The registered address designating part 61 automatically searches, for example, the image processing apparatus 3 connected to the network 4, and displays the image processing apparatus 3 thereby searched in a list form on the display device 33. The administrator of the server device 2 makes an operation to select the image processing apparatus 3 to which the application information 43 is transmitted based on the displayed list, thereby specifying a registered address. The registered address designating part 61 designates the image processing apparatus 3 specified by the administrator as a destination of the application information 43.

The application information transmitting part 62 reads the application information 43 and the client certificate 45 from the storage device 35, and transmits the read application information 43 and client certificate 45 to the image processing apparatus 3 which is designated as the destination. The application information 43 and the client certificate 45 to be transmitted are set in addition to the registration command.

In contrast, in the image processing apparatus 3, as receiving the registration command from the server device 2, the application managing part 52 of the control computer 10 is put into operation. Accordingly, the application managing part 52 associates the application information 43 and the client certificate 45 with each other, and registers in the application management data 23. The image processing apparatus 3 sometimes receives a registration command from a plurality of different server devices 2. In this case, the image processing apparatus 3 associates the application information 43 and the client certificate 45 included in each registration command which is received from the respective plurality of server devices 2 one-to-one, and additionally registers in the application management data 23. In such case, a combination of the application information 43 and the client certificate 45 corresponding to each application service provided by the respective plurality of server devices 2 is registered in the application management data 23. The combination thereby registered is sometimes more than one.

FIG. 6 shows an example of the application management data 23 managed by the application managing part 52. As seen from FIG. 6, multiple application services are registered in the application management data 23. In the example of FIG. 6, four application services are registered. Each of the multiple application services is provided by the different server device 2. The application information 43 and the client certificate 45 received from the respective server device 2 are associated with each application service one-to-one, and registered.

In the example of FIG. 6, however, a client certificate corresponds to server B is not registered. This shows how to be registered when the client certificate is not set in addition to the registration command received from the server B, or when entity data of the client certificate set in addition to the registration command may not be received successfully.

As described above, in the preferred embodiment, the application information 43 and the client certificate 45 are associated with each other one-to-one, and registered in the image processing apparatus 3. So, it is assumed one application service is selected from the multiple application services registered in the application management data 23 by the user. The application managing part 52 is then allowed to uniquely identify the application information 43 and the client certificate 45 correspond to the selected application service.

A processing executed when the application service provided by the server device 2 is used in the image processing apparatus 3 is explained next. As already described, the application managing part 52 manages the application management data 23 registered in advance. It is assumed the user makes an operation to the operational panel 13 to give instructions for displaying an application selection screen. In this case, the application managing part 52 creates the application selection screen based on the application management data 23. The panel controlling part 51 receives the application selection screen thereby created, and the application selection screen is displayed on the display section 14 of the operational panel 13.

Figure 7:
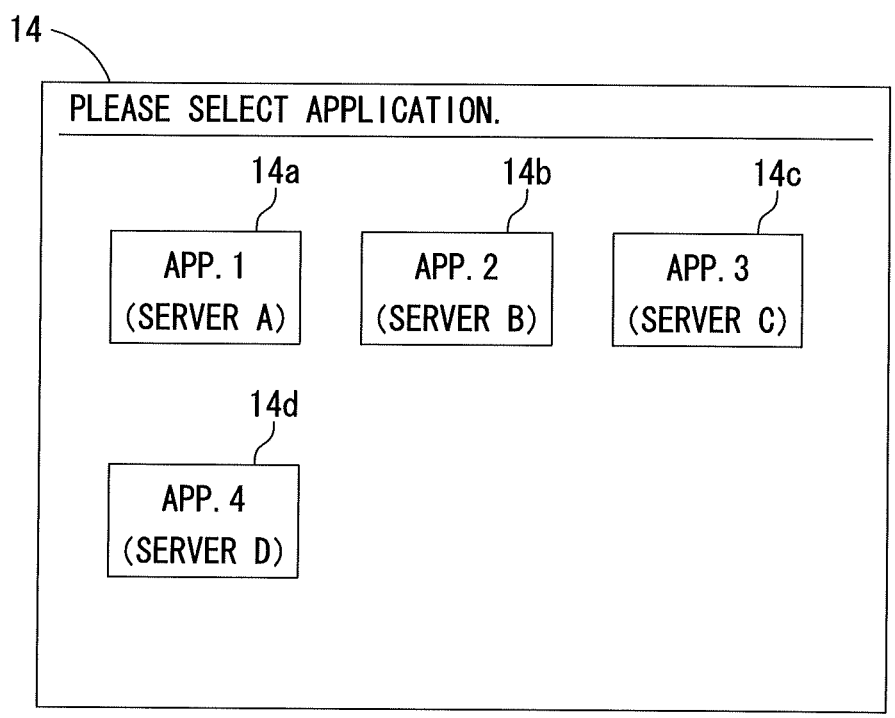
FIG. 7 shows an example of an application selection screen.

FIG. 7 shows an example of the application selection screen displayed on the display section 14 of the operational panel 13. As illustrated in FIG. 7, the application selection screen shows the multiple application services registered in the application management data 23 of FIG. 6 in a manner that allows the user to select. More specifically, an operation key 14a, 14b, 14c and 14d each of which corresponds to the respective multiple application services are displayed on the display section 14. In response to an operation to select one of those more than one operation keys made by the user, a processing to use the application service provided by the server device 2 starts.

As one application service is selected by the user, the information of the operation is received by the application managing part 52 from the panel controlling part 51. The application managing part 52 refers to the application management data 23 based on the information of the operation, so that the application information 43 and the client certificate 45 may be identified. The application managing part 52 thereafter activates the browser program 22. In the preferred embodiment, the application managing part 52 sets destination information included in the application information 43 as an activation parameter of the browser program 22. At the same time, if the client certificate 45 is associated with the application information 43, the client certificate 45 is set as the activation parameter of the browser program 22. The activation parameter is an initial setting parameter for activating the browser.

Figure 8:
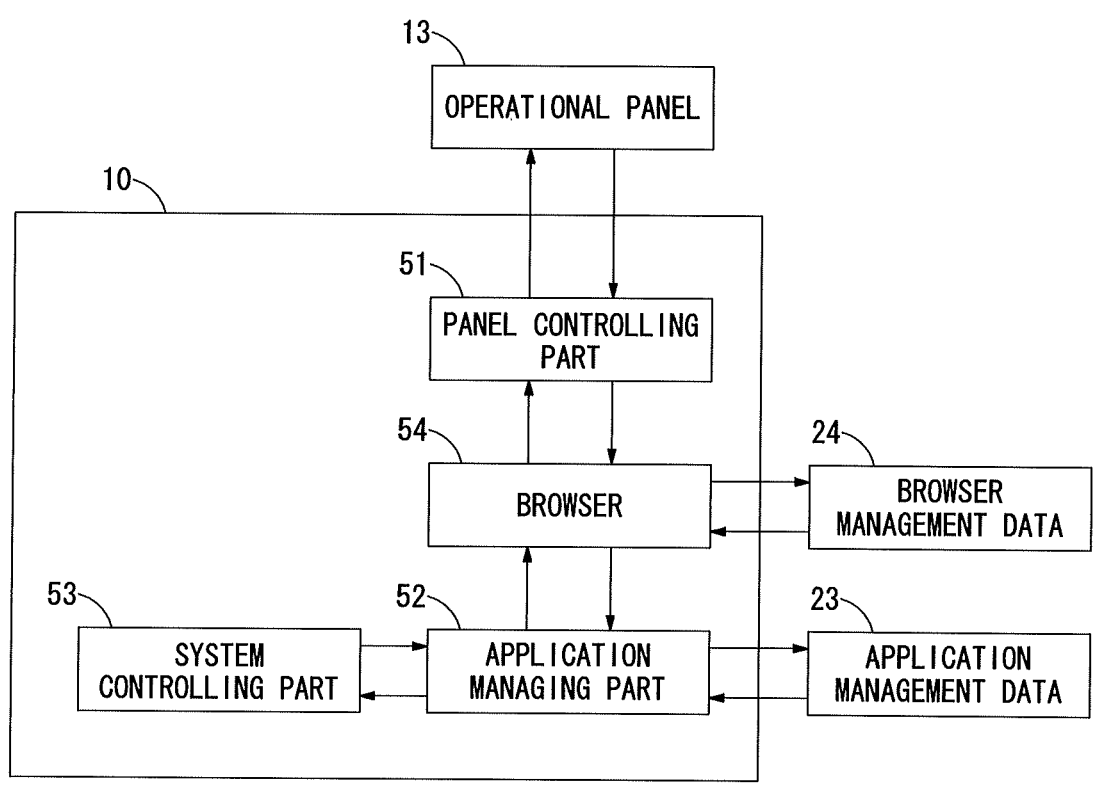
FIG. 8 is a block diagram showing an exemplary functional configuration realized by additional activation of a browser program with the main program being activated in the image processing apparatus.

FIG. 8 is a block diagram showing an exemplary functional configuration realized by additional activation of the browser program 22 with the main program 21 being activated by the CPU 11 of the image processing apparatus 3. As shown in FIG. 8, in response to the execution of the browser program 22 by the CPU 11, the control computer 10 is put into operation to enable a function as a browser 54 in addition to enabling functions as the above-described panel controlling part 51, the application managing part 52, and the system controlling part 53.

The browser 54 has a function as a conventional web browser. The browser 54 performs data communication with the server device 2 via the network interface 16, thereby establishing data communication with SSL session. After data communication is established, the browser 54 acquires a display screen which is an operation screen for use of the application service provided by the server device 2, and which is to be displayed on the display section 14 of the operational panel 13 from the server device 2. So, as the browser 54 of the control computer 10 is activated, the panel controlling part 51 acquires the display screen to be displayed on the display section 14 from the browser 54, and displays the acquired display screen. The browser 54 receives the information of operation detected by the panel controlling part 51 when the operation to the operational panel 13 is made. The browser 54 then transmits the information of the operation to the server device 2 via the network interface 16. As the result, the server device 2 executes processing based on the operation made by the user.

The above-described browser 54 operates at activation based on the activation parameter set by the application managing part 52. As being activated in the control computer 10, the browser 54 sends the request for connection to the server device 2 based on the destination information set by the application managing part 52. When receiving the request for client certificate from the server device 2, the browser 54 transmits the client certificate 45 set by the application managing part 52 to the server device 2.

To be more specific, according to the preferred embodiment, it is assumed the application managing part 52 sets the client certificate 45 registered in the application management data 23 as the activation parameter for activation of the browser 54. In this case, another client certificate stored in the browser management data 24 managed by the browser 54 itself is restricted to be used. The browser 54 then stores at activation the client certificate 45 identified by the application managing part 52 in the memory 12. When receiving the request for client certificate from the server device 2, the browser 54 reads the client certificate 45 from the memory 12, and transmits the read client certificate 45 to the server device 2.

When the client certificate 45 associated with the application information 43 is not registered in the application management data 23, the application managing part 52 is not allowed to set the client certificate 45 as the activation parameter of the browser 54. So, in such case, setting related to the client certificate as for the activation parameter of the browser 54 is not made. As receiving the request for client certificate from the server device 2, the browser 54 refers to the browser management data 24 and executes processing to transmit the client certificate.

Figure 9:
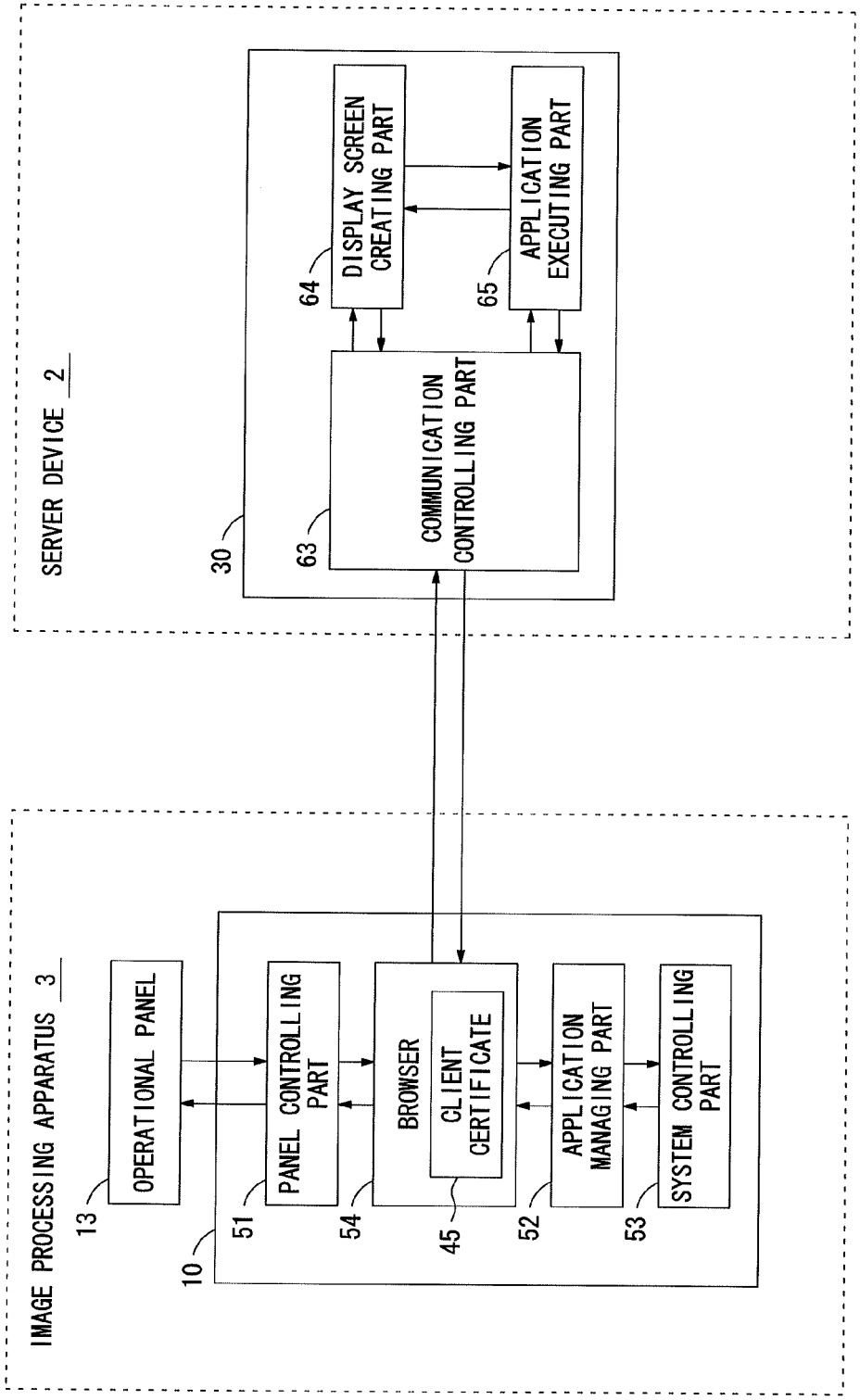
FIG. 9 conceptually shows a processing executed by the image processing apparatus and the server device when the image processing apparatus uses an application service provided by the server device.

FIG. 9 conceptually shows the processing executed by the image processing apparatus 3 and the server device 2 when the image processing apparatus 3 uses the application service provided by the server device 2. As described above, when activating the browser 54, the application managing part 52 of the image processing apparatus 3 sets, as the activation parameter, the client certificate 45 corresponding to the server device 2 which is the destination. The browser 54 stores, at activation, the client certificate 45 in the memory 12, and manages. The browser 54 then sends the request for connection to the server device 2 based on the destination information set by the application managing part 52.

On the other hand, in the server device 2, the above-described web service program 42 is executed by the CPU 30. As the web service program 42 to be executed by the CPU 30, the server device 2 functions as a communication controlling part 63, a display screen creating part 64, and an application executing part 65. The communication controlling part 63 establishes data communication with SSL session with the browser 54. After establishing the data communication with SSL session, the communication controlling part 63 decrypts data received from the image processing apparatus 3 and encrypts data to be transmitted to the image processing apparatus 3. The display screen creating part 64 creates display screen to be displayed on the display section 14 of the operational panel 13. The application executing part 65 executes processing corresponding to the application service provided by the server device 2. The application executing part 65 executes processing corresponding to the information of the operation made by the user received from the image processing apparatus 3.

After receiving the request for connection transmitted by the browser 54 of the image processing apparatus 3, the communication controlling part 63 reads the server certificate 44 from the storage device 35, and transmits not only the read server certificate 44 but also the request for client certificate to the browser 54. In accordance with the settings of the server device 2, whether or not to send the request for client certificate is determined. In the preferred embodiment, the request for client certificate is sent.

After receiving the server certificate 44 from the server device 2, the browser 54 of the image processing apparatus 3 matches the server certificate 44 thereby received with the server certificate registered in advance in the browser management data 24, thereby executing authentication of the server device 2. As the authentication results in success, the browser 54 extracts key information included in the received server certificate 44. As the result, the browser 54 may identify a key for encryption and decryption of data.

In addition, after receiving the request for client certificate from the server device 2, the browser 54 reads the client certificate 45 which has been stored in the memory 12 at the activation, and transmits the read client certificate 45 to the server device 2.

In the server device 2, as receiving the client certificate 45, the communication controlling part 63 matches the received the client certificate 45. Therefore, authentication of the image processing apparatus 3 is executed. When the authentication results in success, the communication controlling part 63 extracts key information included in the received client certificate 45. So, a key for encryption and decryption of data may be identified.

As described above, after the browser 54 and the communication controlling part 63 are both successfully authenticated by each other, the data communication is established. Once the data communication is established, data transmitted and received through the network 4 is encrypted and decrypted with the identified key.

As the display screen creating part 64 creates the display screen to be displayed on the operational panel 13 and outputs the created display screen to the communication controlling part 63, the communication controlling part 63 encrypts information related to the display screen, and transmits to the browser 54. In response to the receipt of the encrypted information, the browser 54 decrypts the received information, and outputs to the panel controlling part 51, thereby displaying on the display section 14 of the operational panel 13.

The user makes operation to the operational panel 14 with the display screen received from the server device 2 is being displayed on the display section 14 of the operational panel 13. The browser 54 then acquires information of the operation from the panel controlling part 51. The acquired information of the operation is encrypted, and transmitted to the communication controlling part 63. After receiving the encrypted information of the operation, the communication controlling part 63 decrypts and outputs to the display screen creating part 64 or the application executing part 65.

As receiving the information of the operation, the display screen creating part 64 creates another display screen on which the operation made by the user is reflected based on the information of the operation. The display screen creating part 64 then outputs the display screen thereby created to the communication controlling part 63 again. The display screen creating part 64 thereafter executes such processing repeatedly, thereby a display screen corresponds to user's operation is displayed on the operational panel 13 of the image processing apparatus 3 every time the user makes operation. More specifically, information related to the user interface is transmitted and received between the display screen creating part 64 and the browser 54 via the communication controlling part 63.

In response to the receipt of the information of the operation, the application executing part 65 executes processing necessary for provision of the application service based on the information of the operation. By way of example, when specific image processing such as OCR (Optical Character Reader) is executed, the application executing part 65 sends a command for request for transmission of image data to be a subject of image processing (hereafter, transmission request command) to the image processing apparatus 3.

In the image processing apparatus 3, the application managing part 52 processes a control command containing the above-described transmission request command. More in detail, in response to the receipt of the transmission request command, the application managing part 52 controls the system controlling part 53 and acquires image data which is a subject of image processing. The application managing part 52 transmits the acquired image data to the server device 2. In the server device 2, the application executing part 65 processes the received image data in accordance with the image processing, and transmits the processed image data to the image processing apparatus 3 again. Such transmission and receipt of the command and image data are not shown in figures specifically. Different from the case for the above-described information related to user interface, these command and image data are directly transmitted and received between the application managing part 52 and the application executing part 65.

As described above, when the application service is provided by the server device 2, the application executing part 65 sends a completion command to the image processing apparatus 3. The application managing part 52 of the image processing apparatus 3 receives the completion command. In response to the receipt of the completion command, the application managing part 52 completes the activation state of the browser 54. In the preferred embodiment, the application managing part 52 causes the browser 54 to discard the client certificate 45 which was set at activation of the browser 54.

Figure 10:
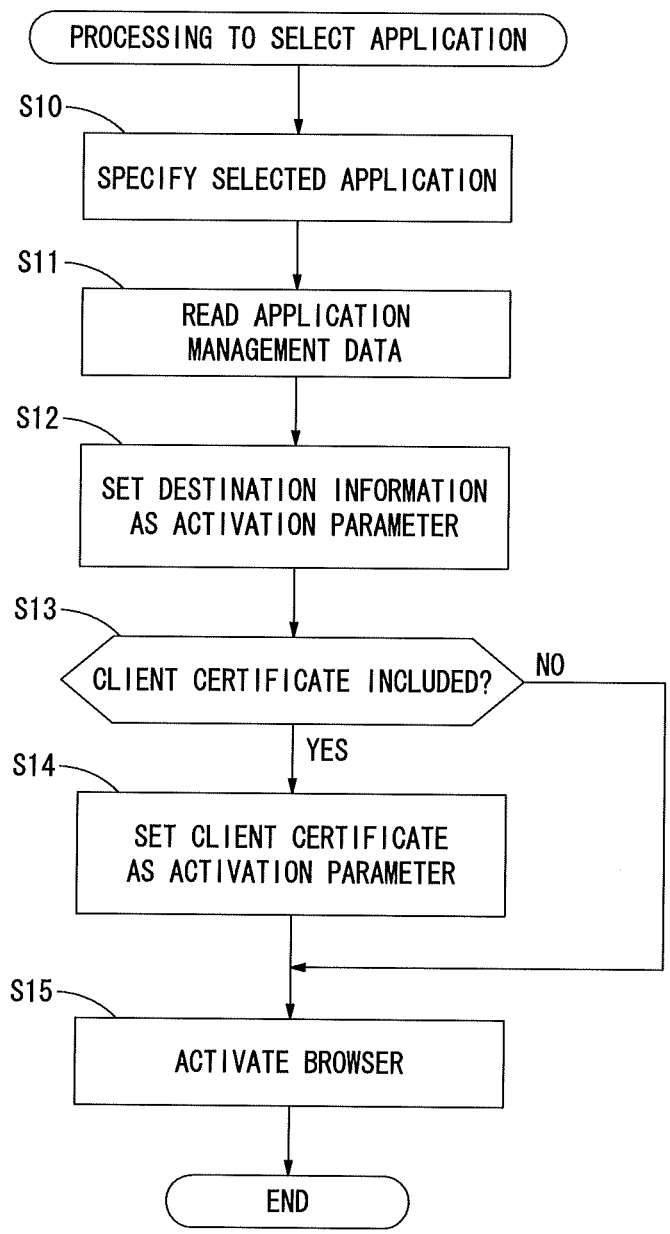
FIG. 10 is a flow diagram explaining an exemplary procedure of a processing executed by an application managing part to activate a browser.

The specific operation of the image processing apparatus 3 is described next. FIG. 10 is a flow diagram explaining an exemplary procedure of a processing executed by the application managing part 52 when the application service is selected by the user. This processing is executed to activate the browser 54. As shown in FIG. 10, the application managing part 52, based on the information of the operation received by the panel controlling part 51, specifies the application service selected by the user at first (step S10). The application managing part 52 reads data which corresponds to the application service selected by the user from the application management data 23 (step S11). The application managing part 52 sets the destination information included in the read application information 43 as the activation parameter of the browser 54 (step S12).

The application managing part 52 determines whether or not the client certificate 45 is included in the data read from the application management data 23 at second (step S13). When the client certificate 45 is included, the application managing part 52 sets the client certificate 45 as the activation parameter of the browser 54 (step S14). When the client certificate 45 is not included (when a result of step S13 is NO), no client certificate is set as the activation parameter of the browser 54. The application managing part 52 reads and executes the browser program 22 stored in the storage device 20, thereby activating the browser 54 (step S15).

Figure 11:
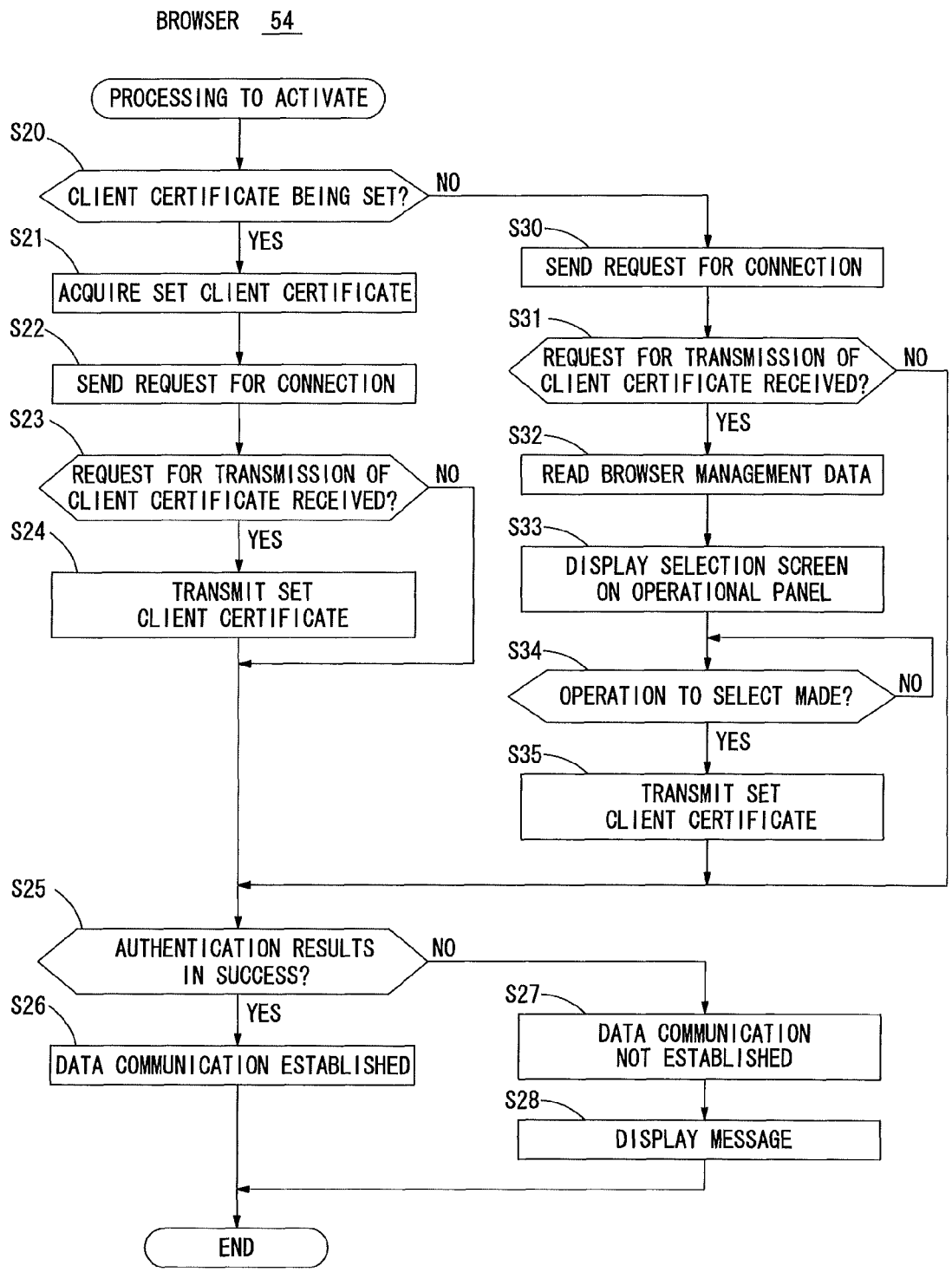
FIG. 11 is a flow diagram explaining an exemplary procedure of a processing executed by the browser at its activation.

FIG. 11 is a flow diagram explaining an exemplary procedure of a processing executed by the browser 54 at its activation. First, the browser 54 determines, at start of activation, whether or not the client certificate 45 is set as the activation parameter (step S20). When the client certificate 45 is set as the activation parameter (when a result of step S20 is YES), the browser 54 acquires the set client certificate 45, and stores in the memory 12 (step S21). The browser 54 sends the request for connection to the server device 2 based on the destination information set as the activation parameter (step S22). The browser 54 then determines whether or not the request for the client certificate is received from the server device 2 (step S23). When the request for the client certificate 45 is received, the browser 54 reads the client certificate 45 acquired in step S21, and transmits to the server device 2 (step S24). When no request for client certificate is received, processing in step S24 is not executed.

Next, the browser 54 determines whether or not the image processing apparatus 3 and the server device 2 are both successfully authenticated by each other (step S25). If authentication results in success, data communication with SSL session is established (step S26). In contrast, if authentication results in failure, data communication with SSL session is not established (step S27). In this case, a message, for instance, indicating that authentication results in failure is displayed on the operational panel 13 (step S28).

When the client certificate 45 is not set at the start of activation of the browser 54 as the activation parameter (when a result of step S20 is NO), the browser 54 sends the request for connection to the server device 2 based on the destination information set as the activation parameter (step S30). The browser 54 determines whether or not the request for client certificate is received from the server device 2 (step S31). If the request for client certificate is received, the browser 54 reads the browser management data 24 (step S32). The browser 54 displays the screen for the user to select a client certificate to transmit to the server device 2 from at least one client certificate registered in the browser management data 24 on the operational panel 13 (step S33). In the preferred embodiment, the selection screen displayed on the operational panel 13 is the same as the one shown in FIG. 14. The browser 54 is put into a waiting state until an operation to select is made by the user (step S34). As the operation to select is made, the selected client certificate is transmitted to the server device 2 (step S35). When the request for client certificate is not received from the server device 2, the processing in step S32 to step S35 is not executed. The browser 54 moves on to the processing in step S25. If the image processing apparatus 3 and the server device 2 are both authenticated by each other as described above, data communication with SSL session is established. On the other hand, if authentication results in failure, a message, for example, indicating that authentication results in failure is displayed on the operational panel 13.

Therefore, it is assumed the plurality of client certificates 45 is registered in the application management data 23 managed by the application managing part 52. Even in the case, each of the plurality of client certificates 45 is associated with the respective application service provided by the server device 2 one-to-one. Therefore, in the preferred embodiment, when one application service is selected by the user, one client certificate 45 to be transmitted to the server device 2 may be identified. A plurality of client certificates is not needed to be searched through. As a result, one client certificate 45 may be identified efficiently.

Moreover, the application managing part 52 sets the client certificate 45 thereby identified as the activation parameter of the browser 54, and activates the browser 54. If receiving the request for client certificate from the server device 2 after starting data communication with the server device 2, the browser 54 transmits the client certificate 45 set in advance as the activation parameter to the server device 2. So, data communication with SSL session with the server device 2 is allowed to be established. In the preferred embodiment, the selection screen for the user to make selection of the client certificate generally displayed is not displayed. The appropriate client certificate 45 for data communication with SSL session is automatically transmitted from the image processing apparatus 3 to the server device 2. Therefore, the user is not necessary to make an operation to select the client certificate, resulting in improvement in operability. Furthermore, the user makes selection of a wrong client certificate. It may also prevent authentication to be resulted in failure because of such user's wrong selection.

Figure 12:
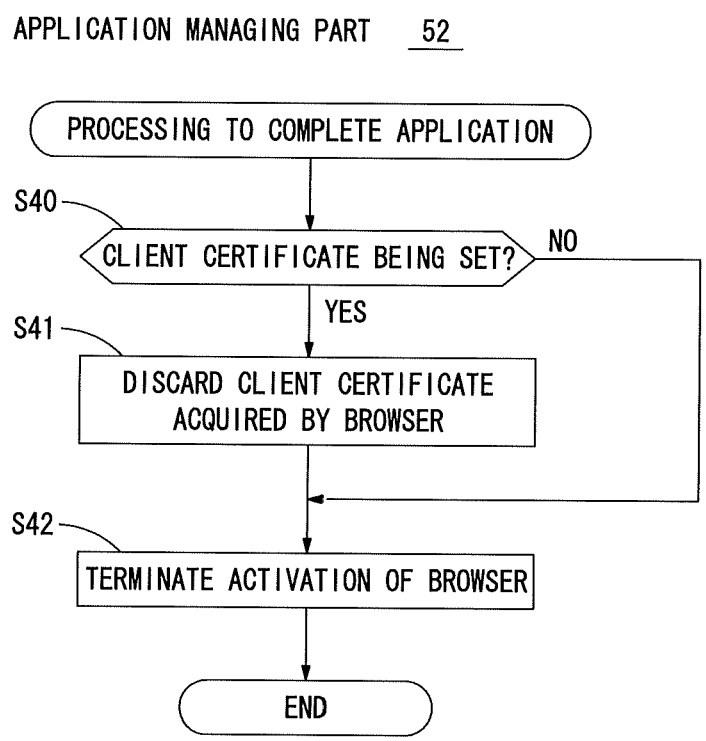
FIG. 12 is a flow diagram explaining an exemplary procedure of a processing executed by the application managing part at completion of the application service.

FIG. 12 is a flow diagram explaining an exemplary procedure of a processing executed by the application managing part 52 at completion of the application service. This processing is executed to terminate the activation of the browser 54. A completion command is received by the application managing part 52 from the server device 2, for example, and this processing starts. After the processing starts, the application managing part 52 determines whether or not the client certificate 45 is set as the activation parameter at the activation of the browser 54 (step S40) as shown in FIG. 12. When the client certificate 45 is set at activation of the browser 54 (when a result of step S40 is YES), the application managing part 52 discards the client certificate 45 which is acquired by the browser 54 (step S41). To be more specific, the application managing part 52 deletes the client certificate 45 which is acquired and stored in the memory 12 by the browser 54 from the memory 12. So, the client certificate 45 which was set as the activation parameter is not registered in the browser management data 24 managed by the browser 54 either. When the client certificate 45 is not set at activation of the browser 54 (when a result of step S40 is NO), the processing in step S41 is not executed. The application managing part 42 terminates the activation of the browser 54 (step S42). The functional configuration of the control computer 10 returns from the state shown in FIG. 8 to the one shown in FIG. 4.

In the preferred embodiment, as described above, when terminating the activation state of the browser 54, the application managing part 52 causes the browser 54 to discard the client certificate 45 set as the activation parameter. Therefore, it allows preventing the client certificate 45 to be stored and remained anywhere beside the application management data 23. Especially, it may prevent the client certificate 45 to be registered in the browser management data 24 which is managed by the browser 54. So, the client certificate 45 registered in the application management data 23 can be effectively prevented from being used improperly.

As explained above, in the image processing system 1 of the preferred embodiment, data communication is performed between the image processing apparatus 3 and the server device 2, so the image processing apparatus 3 is capable of using the application service provided by the server device 2. The server device 2 transmits in advance the application information 43 which enables the use of the application service and the client certificate 45 to authenticate the image processing apparatus 3 to the image processing apparatus 3. When receiving the request for connection from the image processing apparatus 3, the server device 2 sends the request for client certificate to the image processing apparatus 3. The server device 2 establishes data communication with SSL session with the image processing apparatus 3 subject to the acquisition of a certificate which matches the client certificate 45 transmitted in advance to the image processing apparatus 3. So, the application service may be used in the image processing apparatus 3. The image processing apparatus 3 associates the application information 43 and the client certificate 45 received in advance from the server device 2 with each other, and stores in the application management data 23. When the use of application service is specified through the operational panel 13, the application managing part 52 manages the application management data 23 sets the destination information for connecting to the server device 2 based on the application information 43. At the same time, when receiving the request for client certificate from the server device 2, the application managing part 52 activates the browser 54 with designating transmission of the client certificate 45 associated with the application information 43. The browser 54 sends the request for connection to the server device 2 based on the destination information set by the application managing part 52. If the request for client certificate is received from the server device 2, the browser 54 transmits the client certificate 45 identified by the application managing part 52 to the server device 2. The browser 54 then establishes data communication with SSL session with the server device 2.

According to the image processing system 1 as described above, even when the receiving the request for client certificate from the server device 2, the image processing apparatus 3 automatically transmits the appropriate client certificate 45 to be transmitted in an efficient manner. Therefore the user is not required to make operation to select a client certificate by himself, resulting in reduction of operation load placed on the user. Moreover, even when a plurality of client certificates is registered, the appropriate client certificate 45 to be transmitted to the server 2 may be identified without the plurality of client certificates to be searched through. The appropriate client certificate 45 may be transmitted to the server device 2 without lowering efficiency in the execution of processing. As a result, data communication with SSL session between the image processing apparatus 3 and the server device 2 is allowed to be established rapidly.

In addition, according to the above-described image processing system 1, the application information 43 and the client certificate 45 are registered in the image processing apparatus 3 with being associated with each other. In contrast with the conventional case where the user information and a client certificate are associated with each other and registered, the above-described image processing system 1 has following advantages. At first, in the conventional case, all users who use an image processing apparatus need to make operations to register the client certificate by themselves. For the case of the image processing system 1 of the preferred embodiment, the application service needs to be registered with the image processing apparatus 3 just once, and the application service is made available to all users. So, it has an advantage of improvement in operability. At second, in the conventional case, the client certificate is associated with user information of all users who use one application service. For the case of the image processing system 1 of the preferred embodiment, only one client certificate is associated with one application service. Therefore, it has an advantage to prevent a resource (storage region) of the storage device 20 to be wasted.

As described above, when the request for client certificate is received from the server device, the client certificate which is associated with the application information and stored is transmitted to the server device. Data communication is then established. Therefore, the user is not necessary for selecting the client certificate to transmit to the server device. The operation load placed on the user may be reduced. Also, even when the multiple client certificates are registered, the client certificate to be transmitted to the server device may be identified without the multiple client certificates being searched through. The appropriate client certificate may be transmitted without lowering efficiency in processing. As the result, data communication between the image processing apparatus and the server device is allowed to be established rapidly.

MODIFICATIONS

While the preferred embodiment of the present invention has been described above, the present invention is not intended to be limited to the details shown above. Numerous modifications and variations can be devised without departing from the scope of the invention.

As an example, the above-described FIG. 6 shows the example in which the application information 43 and only entity data of the client certificate 45 are associated with each other, and stored in the application management data 23. As described above, however, the application information 43 and the client certificate 45 are registered in the same manner in both cases where the client certificate is not attached to the registration command received from the server device 2, and where entity data of the client certificate attached with the registration command may not be received normally. In order to distinguish the above-described two cases, a flag which indicates whether or not the client certificate is attached to the registration command may be registered in the application management data 23. As for instance, if the client certificate is attached to the registration command, the flag is defined as "1." If the client certificate is not attached, the flag is defined as "0." It is assumed the entity data of the client certificate is not registered even though the flag is "1." In such case, failure of receiving normally the entity data from the server device 2 is proved. When the request for client certificate is received from the server device 2, failure of receiving normally the entity data of the client certificate to be transmitted to the server device 2 becomes clear. Therefore, the user may not be caused to make an operation to select the client certificate. Another, the client certificate may not be transmitted. In this case, the user does not need to make unnecessary operation to select, and the operability further improves.

Moreover, according to the preferred embodiment as described above, the image processing apparatus 3 is a device which is called by name such as a digital complex device or a MFP. However, the image processing apparatus 3 is not always this type of device.

Furthermore, the above-described application service is just an example. The application service provided by the server device 2 is not limited to the one described above.

What is claimed is:

1. An image processing system in which data communication is performed between an image processing apparatus and a server device, and said image processing apparatus is made capable of using an application service provided by said server device, said server device including:
a transmission part for transmitting in advance application information to use said application service and a client certificate to authenticate said image processing apparatus to said image processing apparatus; and
a communication controlling part for sending a request for transmission of the client certificate to said image processing apparatus when a request for connection is received from said image processing apparatus and for establishing data communication with said image processing apparatus subject to acquisition of a certificate which matches the client certificate transmitted in advance to said image processing apparatus, thereby causing said image processing apparatus to be capable of using said application service;

said image processing apparatus including:
a storage part for associating said application information and the client certificate received in advance from said server device with each other and for storing therein said associated application information and client certificate;
an operation part which includes a display part on which various types of information is displayed;
a browser for acquiring information of a screen to use said application service from said server device by performing data communication with said server device and for making the screen displayed on said display part; and
an application managing part for managing said application information and the client certificate stored in said storage part and for controlling said browser, wherein
when use of said application service is specified via said operation part, said application managing part sets information to connect to said server device based on said application information, and activates said browser by designating transmission of the client certificate which is associated with said application information if the request for transmission of the client certificate is received from said server device,
said browser sends the request for connection to said server device based on the information set by said application managing part, and transmits the client certificate identified by said application managing part to said server device when the request for transmission of the client certificate is received from said server device, thereby establishing data communication with said server device, and
the storage part associates a plurality of pieces of application information with a plurality of client certificates one-to-one, and stores therein each associated piece of application information and respective client certificate.

2. The image processing system according to claim 1, wherein
said browser holds the client certificate identified at activation by said application managing part, and
in response to completion of the use of said application service, said application managing part terminates activation state of said browser, and discards the client certificate hold in said browser.

3. The image processing system according to claim 1, wherein said application information indicates an address of said server device.

4. An image processing apparatus performs data communication with a server device, thereby using an application service provided by said server device, the image processing apparatus comprising:
a storage part for associating application information and a client certificate received in advance from said server device with each other, and for storing therein said associated application information and client certificate;
an operation part which includes a display part on which various types of information is displayed;
a browser for acquiring information of a screen to use said application service from said server device by performing data communication with said server device and for making the screen displayed on said display part; and
an application managing part for managing said application information and the client certificate stored in said storage part and for controlling said browser, wherein
when use of said application service is specified via said operation part, said application managing part sets information to connect to said server device based on said application information, and activates said browser by designating transmission of the client certificate which is associated with said application information if a request for transmission of the client certificate is received from said server device,
said browser sends a request for connection to said server device based on the information set by said application managing part, and transmits the client certificate identified by said application managing part to said server device when the request for transmission of the client certificate is received from said server device, thereby establishing data communication with said server device, and
the storage part associates a plurality of pieces of application information with a plurality of client certificates one-to-one, and stores therein each associated piece of application information and respective client certificate.

5. The image processing apparatus according to claim 4, wherein
said browser holds the client certificate identified at activation by said application managing part, and
in response to completion of the use of said application service, said application managing part terminates activation state of said browser and discards the client certificate hold in said browser.

6. The image processing apparatus according to claim 4, wherein said application information indicates an address of said server device.

7. A non-transitory computer readable medium on which a program is stored, said program to be executed by an image processing apparatus in which an application service provided by a server device is used by performing data communication with said server device, said image processing apparatus including:
a storage part for storing various types of information;
an operation part which includes a display part on which various types of information is displayed;
a browser for acquiring information of a screen to use said application service from said server device by performing data communication with said server device and for displaying said acquired information of the screen on said display part; and
a computer for executing said program, said program causing said computer to execute processing comprising the steps of:
(a) associating application information and a client certificate received from said server device with each other and storing said associated application information and client certificate in said storage part;
(b) setting information to connect to said server device based on said application information when use of said application service is specified via said operation part, and activating said browser by designating transmission of the client certificate associated with said application information if a request for transmission of the client certificate is received from said server device, and
(c) associating a plurality of pieces of application information with a plurality of client certificates one-to-one, and storing each associated piece of application information and respective client certificate in said storage part.

8. The non-transitory computer readable medium according to claim 7, wherein
said browser holds the client certificate identified at activation,
said program causing said computer to execute processing further comprising the steps of:
(c) terminating activation state of said browser in response to completion of the use of said application service; and
(d) deleting the client certificate hold in said browser at time of termination of the activation state of said browser.

9. The non-transitory computer readable medium according to claim 7, wherein said application information indicates an address of said server device.

10. A data communication establishing method for establishing data communication with a server device employed in an image processing apparatus which uses an application service provided by said server device with performing data communication with said server device, the method comprising the steps of:
(a) associating application information and a client certificate received in advance from said server device with each other and storing said associated application information and client certificate in a predetermined storage part;
(b) transmitting a request for connection to said server device based on said application information when use of said application service is specified via a predetermined operation part;
(c) transmitting the client certificate which is associated with said application information in said storage part when a request for transmission of the client certificate is received from said server device after transmission of said request for connection, thereby establishing data communication with said server device; and
(d) associating a plurality of pieces of application information with a plurality of client certificates one-to-one, and storing each associated piece of application information and respective client certificate in said storage part.

11. The method of claim 10, wherein said application information indicates an address of said server device.

* * * * *